(12) United States Patent
Purohit et al.

(10) Patent No.: US 9,733,127 B2
(45) Date of Patent: Aug. 15, 2017

(54) SYSTEM AND METHOD FOR ESTIMATING SIZE AND LOCATION OF MOVING OBJECTS

(71) Applicant: Google Inc., Mountain View, CA (US)

(72) Inventors: Aveek Ravishekhar Purohit, Mountain View, CA (US); William Alan Saperstein, San Carlos, CA (US)

(73) Assignee: Google Inc., Mountain View, CA (US)

( * ) Notice: Subject to any disclaimer, the term of this patent is extended or adjusted under 35 U.S.C. 154(b) by 26 days.

(21) Appl. No.: 15/000,067

(22) Filed: Jan. 19, 2016

(65) Prior Publication Data

US 2017/0205288 A1 Jul. 20, 2017

(51) Int. Cl.
*G01J 5/00* (2006.01)
*G08B 13/24* (2006.01)
*H05B 37/02* (2006.01)
*G01V 8/10* (2006.01)

(52) U.S. Cl.
CPC .............. *G01J 5/0025* (2013.01); *G01V 8/10* (2013.01); *G08B 13/2494* (2013.01); *H05B 37/0227* (2013.01)

(58) Field of Classification Search
CPC ........ G01J 5/0022; G01J 5/0025; G01V 8/10; G08B 13/2494; H05B 37/0227
See application file for complete search history.

(56) References Cited

U.S. PATENT DOCUMENTS

| | | | |
|---|---|---|---|
| 5,138,638 A | 8/1992 | Frey | |
| 5,923,250 A | 7/1999 | Pildner et al. | |
| 6,137,407 A | 10/2000 | Akagawa et al. | |
| 6,265,972 B1 | 7/2001 | Lee | |
| 6,346,705 B1 | 2/2002 | Lee et al. | |
| 7,019,641 B1 | 3/2006 | Lakshmanan et al. | |
| 8,314,390 B2 | 11/2012 | Micko et al. | |
| 8,542,118 B2 | 9/2013 | Al-Kadi et al. | |
| 8,829,439 B2 | 9/2014 | Damarla | |
| 2012/0075110 A1 | 3/2012 | Boughorbel et al. | |
| 2013/0015355 A1 | 1/2013 | Noone et al. | |
| 2014/0139116 A1* | 5/2014 | Reed .................. | H05B 33/0854 315/153 |
| 2014/0181710 A1* | 6/2014 | Baalu ...................... | G06F 3/005 715/765 |

FOREIGN PATENT DOCUMENTS

WO 2001067414 9/2001
WO 2014155088 A1 10/2014

* cited by examiner

*Primary Examiner* — Mark R Gaworecki
(74) *Attorney, Agent, or Firm* — Morris & Kamlay LLP

(57) ABSTRACT

A system is disclosed for determining the size and location of an object in a monitored area. The system includes a passive infrared sensor (PIR) configured to detect infrared radiation in a monitored area, a lens system including a plurality of lenslets, the plurality of lenslets encoded to create a mask area within the monitored area, a reflective element configured to focus the infrared radiation in the monitored area onto the PIR sensor, and a processor. The processor is configured to detect a moving object in the monitored area, initiate the movement of the reflective element, generating an object signature over time as the reflective element is moved, and the size and location of the object is determined based on the object signature.

17 Claims, 7 Drawing Sheets

SYSTEM AND METHOD FOR ESTIMATING SIZE AND LOCATION OF MOVING OBJECTS

BACKGROUND

The present subject matter relates to a detection system. More specifically, the present subject matter relates to the detection, sizing and location of a moving object.

Low power and low cost passive infrared (PIR) based motion sensors do not provide information about the shape and location of a moving entity in the field of view of the sensor. Accordingly, it is difficult to distinguish between types of moving objects detected by these sensors, for example, pets versus humans, crawling humans versus a dog or pet, etc.

Therefore, there exists a need for an improved motion detection system.

BRIEF SUMMARY

According to an embodiment of the disclosed subject matter, a system that determines the size and location of an object in a monitored area includes a passive infrared sensor (PIR) configured to detect infrared radiation in a monitored area, a lens system including a plurality of lenslets, the plurality of lenslets encoded to create a mask area within the monitored area, a reflective element configured to focus the infrared radiation in the monitored area onto the PIR sensor, and a processor. The processor is configured to detect a moving object in the monitored area, initiate the movement of the reflective element, generate an object signature over time as the reflective element is moved, and the size and location of the object is determined based on the object signature.

In an embodiment, the processor is further configured to retrieve from a pattern database one or more pattern signatures, and comparing the retrieved one or more pattern signatures to the object signature, wherein the pattern signature that is determined to be closest to the object signature is used to determine the size and location of the detected object.

In an embodiment, the processor is further configured to initiate an alarm signal when the object signature is above a threshold signal.

In an embodiment, the processor is further configured to turn on a light in the monitored area when the object signature is above a threshold signal.

In an embodiment, the mask area is moved through the monitored area as the reflective element is moved.

In an embodiment, the processor is configured to compare the object signature to a threshold signature.

In an embodiment, the processor is further configured to initiate an alarm signal when the object signature is greater than the threshold signature, and turning on one or more lights in the monitored area when the object signature is greater than the threshold signature.

According to an embodiment of the disclosed subject matter, a method comprises detecting infrared radiation in a monitored area by a passive infrared (PIR) sensor, initiating a movement of a reflective element when a moving object is detected in the monitored area by a processor, generating an object signature of the detected object over time as the reflective element moves, and determining a size and location of the object based on the generated object signature.

According to an embodiment of the disclosed subject matter, means for determining the size and location of an object in a monitored area are provided comprising means for detecting infrared radiation in a monitored area by a passive infrared (PIR) sensor, initiating a movement of a reflective element when a moving object is detected in the monitored area by a processor, generating an object signature of the detected object over time as the reflective element moves, and determining a size and location of the object based on the generated object signature.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
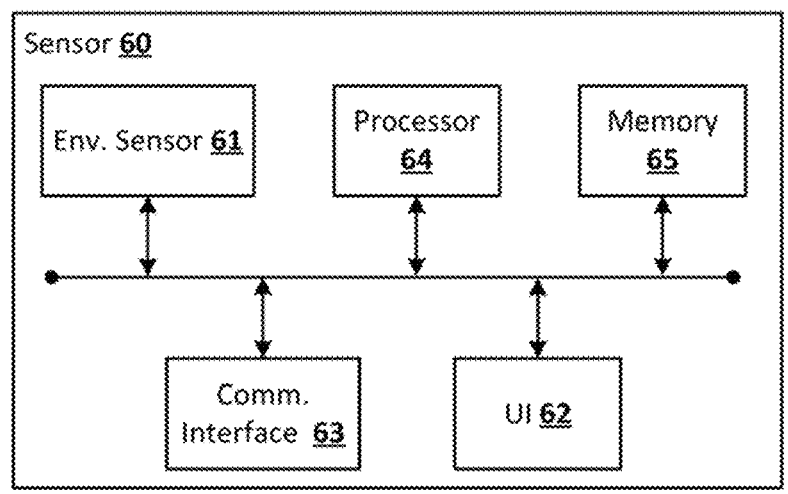
FIG. 1 shows an example block diagram of a sensor.

A disclosed implementation of the present subject matter is directed to providing a detection system that determines the size and location of an object that has entered a monitored area. The detection system may include a sensor for detecting movement within the monitored area, a lens system, and a reflecting element. When an object is detected, the reflecting element is moved in a predetermined direction to mask the field of view of the lens to generate a signal over time that corresponds to the detected objects location and size. For example, when an object is detected in the monitored area of the detection system, the reflecting element begins to rotate. The signal is generated by the detected object as the reflecting element rotates, and the detection system determines the size and location of the object based on the signal generated. For example, the sensor may determine that the object is a pet based on the signal, and therefore fail to activate an alarm or turn on one or more lights in the monitored area.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

A sensor may include hardware in addition to the specific physical sensor that obtains information about the environment. FIG. 1 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 2:
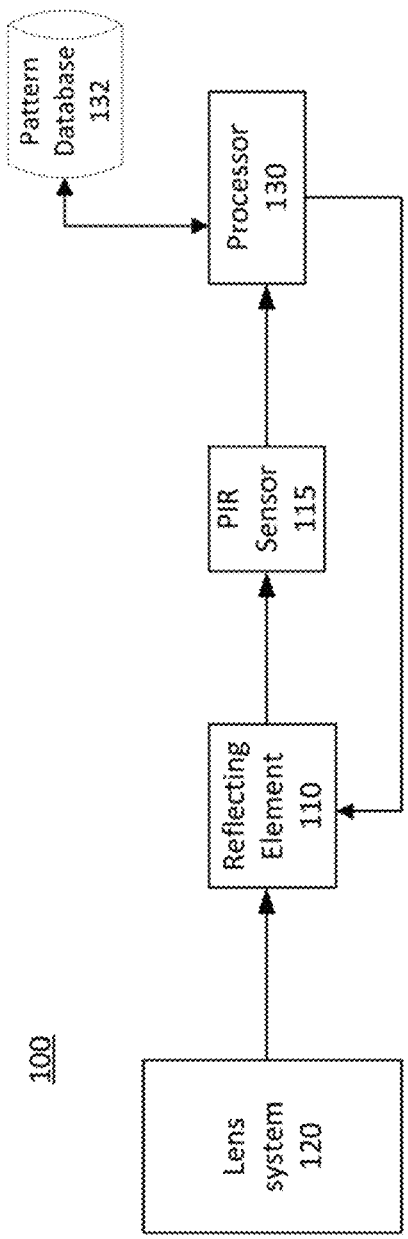
FIG. 2 shows an example block diagram of a detection system according to an embodiment of the disclosed subject matter.

FIG. 2 is an example illustration of an implementation of a detection system 100. The detection system 100 includes a lens system 120, a reflecting element 110, a sensor 115, and a processor 130. The sensor 115 may be a passive infrared (PIR) sensor that detects the presence of a change in infrared radiation present in a monitored area. The lens system 120, configured to focus the infrared radiation from the area being monitored onto the PIR sensor 115, may be a Fresnel lens system comprising a plurality of lenslets, each lenslet including patterned intensities that create a mask in the field of view. Each lenslet creates a right and left (R & L) image. When a target, i.e., object, moves within the monitored area the signal generated by the sensor 115 corresponds to the intensity of the IR radiation captured by each individual lens.

The PIR sensor 115 generates a signal that may be filtered, amplified, and digitized by a processor 130. The processor 130 is configured to receive the signal and determine whether a moving object has been detected in the monitored area. In an implementation, a change in the signal received from the PIR sensor 115 may indicate that an object that was not previously present has entered the area being monitored. In an implementation, the received signal may be stored for further analysis to determine the size and location of the detected object.

Figure 3:
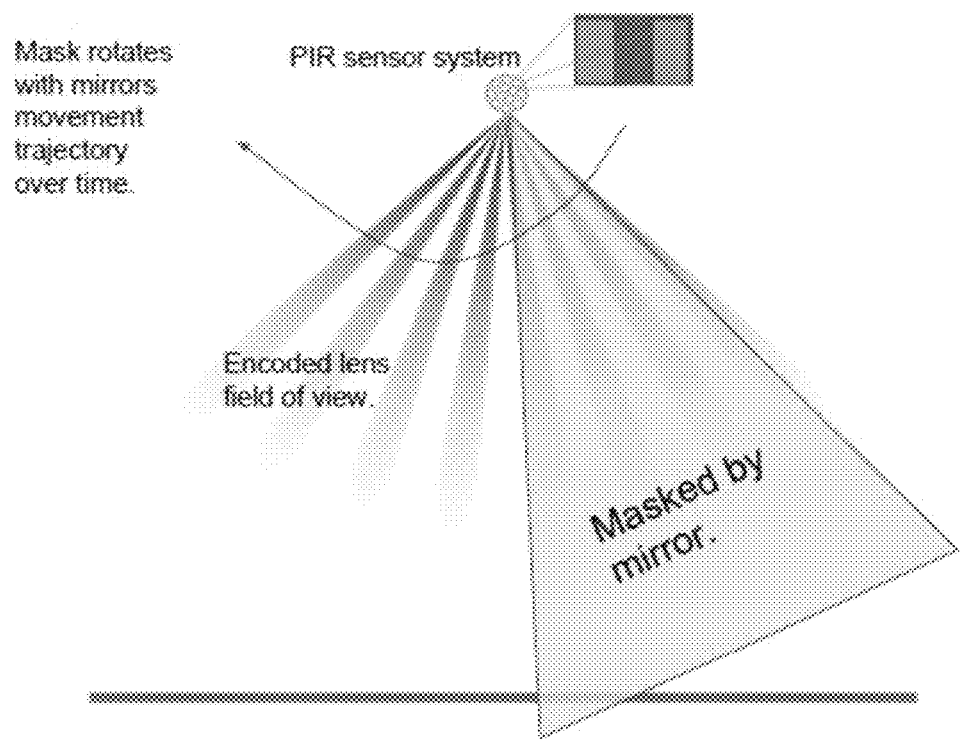
FIG. 3 shows an example illustration of the mask area according to an embodiment of the disclosed subject matter.

The reflecting element 110 may be positioned to reflect IR radiation from the lens system 120 to the PIR sensor 115. The reflecting element 110, coupled to the processor 130, is configured to be movable. The movement of the reflecting element 110 moves the mask area through the field of view of the monitored area, preventing the PIR sensor from detecting infrared radiation in the masked area. The masked area moves through the field of view of the monitored area as the reflecting element 110 rotates. The reflecting element 110 may be a mirror, for example, a moving MEMS mirror system, or metal piece wherein the surface of the metal deflects the infrared radiation onto the PIR sensor. An example illustration of the operation of the moving reflecting element and the mask is shown in FIG. 3.

The reflecting element 110 is configured to move in response to a move signal from the processor 130. The processor 130 generates a move signal that initiates the movement of the reflecting element 110. The move signal may be generated when the processor 130 determines that a moving object has been detected in the monitored area. In an implementation, the reflecting element 110 moves in a predetermined direction such that the masked area moves throughout the monitored area. Each time the masked area is moved, the infrared radiation in the unmasked area may be deflected off the reflecting element 110 onto the PIR sensor 115, generating a signal overtime. The processor 130 receives each signal generated during the movement of the reflecting element and stores the signal for further processing.

Figure 4:
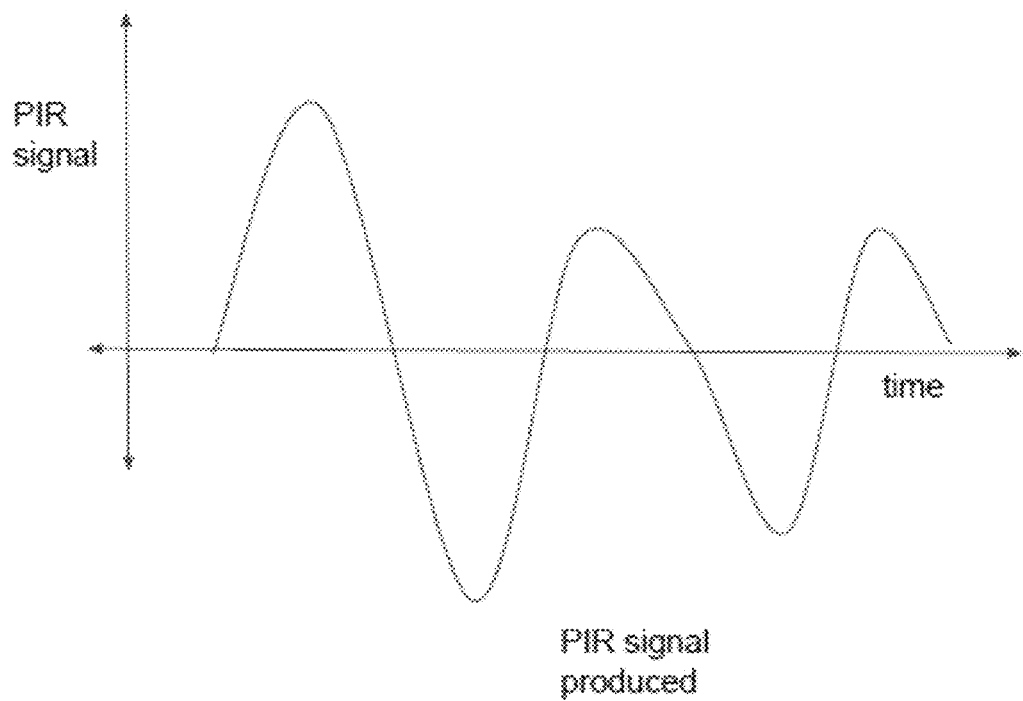
FIG. 4 shows an example graph of an object signature produced according to an embodiment of the disclosed subject matter.

Once the reflective element 110 has moved such that the masked area has moved through the monitored area, the processor 130 may combine the stored signals generated during the movement of the reflecting element 110 to generate an object signature, e.g., the PIR signal over time. An example object signature generated by the processor is illustrated in FIG. 4. The object signature may be used to identify, by the processor 130, the size of the object and the location of the object when the object was detected. In an implementation, the object signature may be compared to a threshold signature. The threshold signature may be a predetermined object signature that represents a threshold of detected IR in the monitored area over time that equates to the minimum signature of an object that is not a pet. For example, through testing of the detection system, a minimum signature is determined for a human. The minimum signature for a human may then be used as the threshold signature. In an implementation, when the object signature includes detected IR having intensity levels greater than those exhibited in the threshold signature, the object is determined to be a human. If the object signature is below the threshold signature, e.g., the detected IR included in the object signature is lower than those exhibited in the threshold signature, the processor 130 may determine that the object is an animal or other object that is not of concern. If such a determination is made, the processor 130 also may determine that an alarm event has not occurred, and therefore does not initiate an alarm signal, and/or that a light controlled by the detection system does not need to be turned on.

If the object signature is above the threshold signature, the processor 130 may determine that the object is a person. This determination by the processor may result in a determination that an intruder has been detected in the monitored area when an intruder detection system is active. The processor 130 may then initiate an alarm signal indicating that an intruder has been detected.

In the case that the detection system operates lighting in the monitored area, lighting in the monitored area may be turned on if the object is determined to be a person.

In an implementation, the processor 130 may determine the location and size of the detected object based at least in part on a comparison of the generated object signature to one or more pattern signatures that may be stored in the pattern database 132. A pattern signature may be a generated signature of a known object. For example, a dog of a certain shape and size may be detected in the monitored area. The dog signature is generated using the moving reflective element and stored in the pattern database 132. Other known pattern signatures may be generated and stored as well. The processor 130 may access the pattern database 132 to compare the generated object signature to each of the stored pattern signatures to determine which of the pattern signatures the object signature most closely matches. Based on the closest matching pattern signature, the processor 130 determines whether the detected object is an animal, such as a pet, or a person, such as an intruder. As disclosed above, if the processor 130 determines that the detected object is a person, based on the generated object signature, the processor 130 triggers an alarm signal. If the processor 130 determines that the detected object is an animal, based on the generated object signature, the processor 130 does not trigger the alarm signal. An example illustration of the operation of the detection system 500 is illustrated in FIG. 5.

Figure 5:
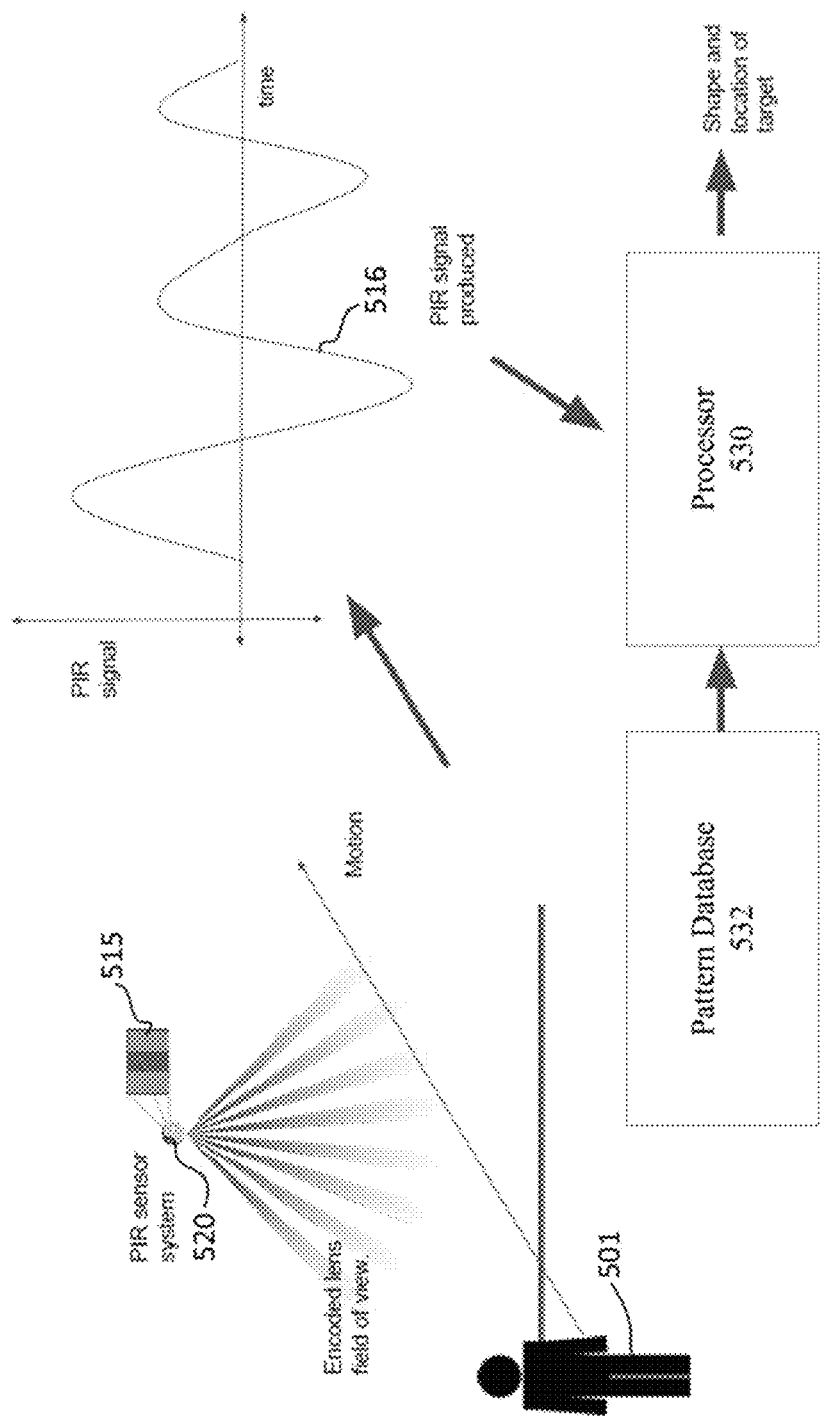
FIG. 5 shows an example illustration of the operation of the detection system according to an embodiment of the disclosed subject matter.

As illustrated in FIG. 5, a person entering the monitored area (i.e., field of view) the PIR sensor detects the movement. A PIR signal 516, i.e., the object signature, is generated. The location of the object 501 may be encoded in phase and magnitudes of peaks of the object signature 516 over time. The object signature 516 may be forwarded to the processor 530, which processes the received object signature 516 to determine if the object signature 516 matches one of a plurality of patterns stored in a pattern database 532, for example using a pattern matching algorithm. Once a pattern match is identified, the processor 530 determines the shape and location of the target 501.

In an implementation, the location of the detected object may be encoded in the phase and magnitudes of the peaks of the object signature 516 over time. Based on the location of the peaks in the object signature, the processor may determine from what and/or in what direction the object is coming and/or going in the monitored area.

Figure 6:
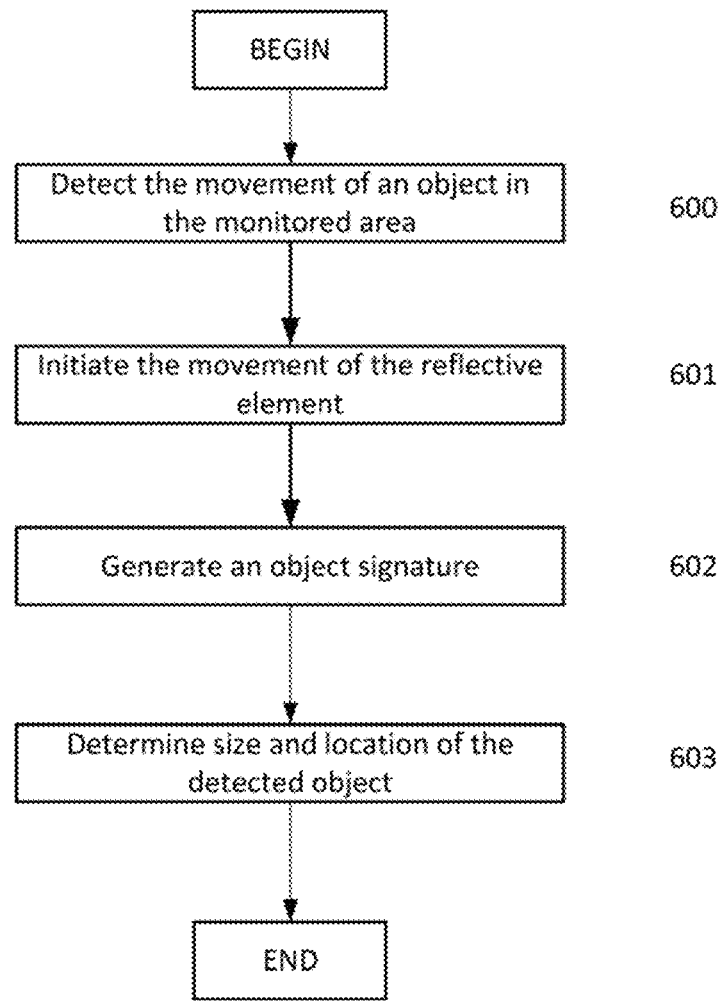
FIG. 6 shows an example flow diagram according to an embodiment of the disclosed subject matter.

An example flow diagram of the motion sensor system is illustrated in FIG. 6. A motion detection system may detect movement of an object within a monitored area (600). Upon detection of the moving object, the processor initiates the movement of the reflective element to move a mask area through the monitored area (601). An object signature is generated by the processor (602) and determines the size and location of the detected object based on the object signature (603). Based on the determined size and location of the detected object, the processor may initiate an alarm signal when the detected object is determined to be a human (604).

In some configurations, two or more sensors, as disclosed herein, may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor, as disclosed herein, in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7:
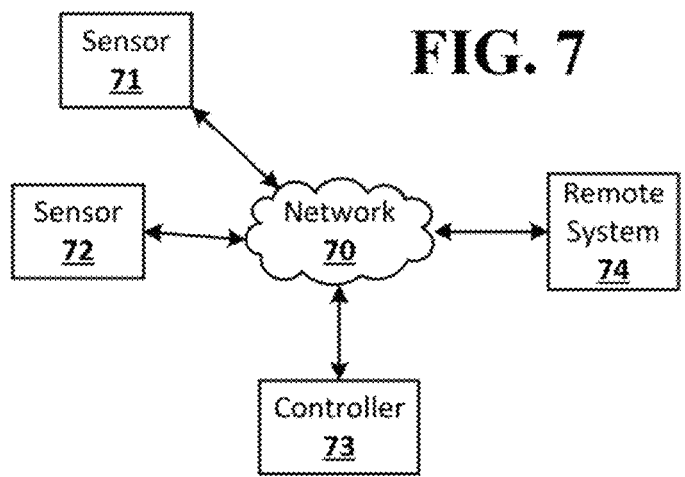
FIG. 7 shows an example of a network system according to an embodiment of the disclosed subject matter.

FIG. 7 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 7 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 7.

In some embodiments, the smart-home environment of the sensor network shown in FIG. 7 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 7. A smart wall switch may detect ambient lighting conditions, and control a power and/or dim state of one or more lights, as disclosed hereinabove. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 7 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key fobs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 8:
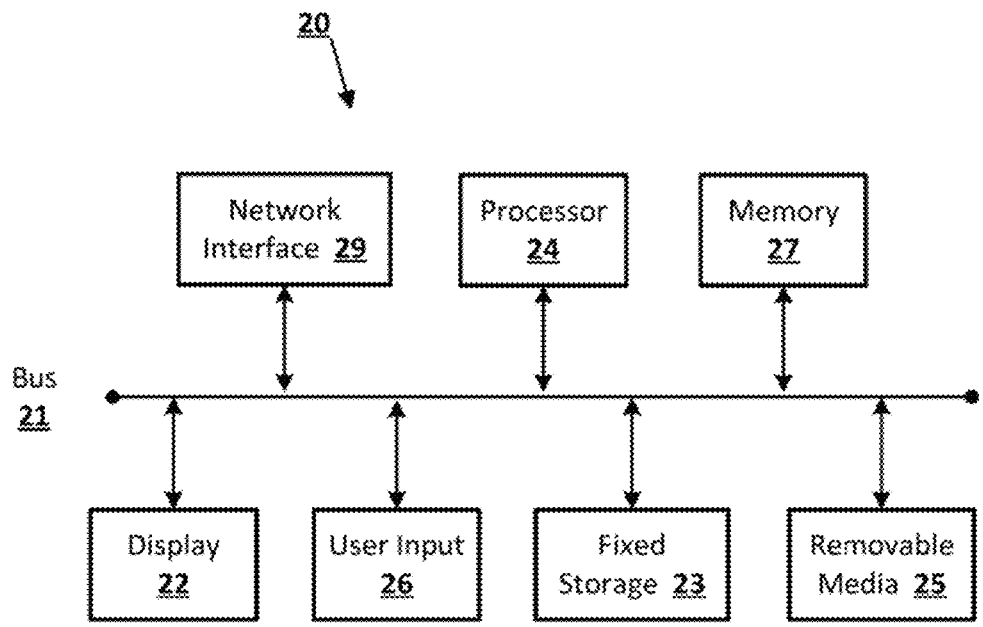
FIG. 8 shows a computing device according to an embodiment of the disclosed subject matter.

Embodiments of the presently disclosed subject matter may be implemented in and used with a variety of computing devices. FIG. 8 is an example computing device 20 suitable for implementing embodiments of the presently disclosed subject matter (e.g., processor 130 of FIG. 2). For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
   a passive infrared (PIR) sensor configured to detect infrared radiation in a monitored area;
   a lens system including a plurality of lenslets, the plurality of lenslets encoded to create a mask area within a field of view of the monitored area;
   a reflective element configured to focus the detected infrared radiation in the monitored area onto the PIR sensor; and
   a processor configured to:
      detect a moving object in the monitored area;
      initiate movement of the reflective element;
      generating an object signature over time based on the detected IR focused onto the PIR sensor as the reflective element moves; and
      determining a size and location of the object based on the object signature.

2. The system of claim 1, wherein the processor is further configured to:
   retrieve from a pattern database one or more pattern signatures; and
   compare the retrieved one or more pattern signatures to the object signature,
   wherein the pattern signature that is determined to be most similar to the object signature is used to determine the size and location of the moving object.

3. The system of claim 2, wherein the processor is further configured to initiate an alarm signal when the object signature is above a threshold signal.

4. The system of claim 2, wherein the processor is further configured to turn on a light in the monitored area when the object signature is above a threshold signal.

5. The system of claim 2, wherein the mask area is moved through a field of view of the monitored area as the reflective element is moved.

6. The detection system of claim 1, wherein the processor is configured to compare the object signature to a threshold signature.

7. The system of claim 6, wherein the processor is further configured to:
   initiate an alarm signal when the object signature is greater than the threshold signature; and
   turning on one or more lights in the monitored area when the object signature is greater than the threshold signature.

8. A method comprising:
   detecting infrared radiation in a monitored area by a passive infrared (PIR) sensor;
   initiating a movement of a reflective element when a moving object is detected in the monitored area by a processor;
   generating an object signature of the detected IR of the moving object over time as the reflective element moves; and
   determining a size and location of the object based on the generated object signature.

9. The method of claim 8, further comprising:
   retrieving from a pattern database one or more pattern signatures; and
   comparing the retrieved one or more pattern signatures to the object signature,
   wherein the pattern signature that is determined to be most similar to the object signature is used to determine the size and location of the detected object.

10. The method of claim 9, further comprising initiating an alarm signal when the object signature is above a threshold signal.

11. The method of claim 9, further comprising turning on a light in the monitored area when the object signature is above a threshold signal.

12. The method of claim 8,
    wherein the movement of the reflective element moves a mask area through the monitored area, and
    wherein the mask area prevents the PIR sensor from sensing infrared radiation in the mask area.

13. The method of claim 8, further comprising comparing, by the processor, the object signature to a threshold signature.

14. The method of claim 13, further comprising initiating an alarm signal when the object signature is greater than the threshold signature.

15. The method of claim 13, further comprising turning on one or more lights in the monitored area when the object signature is greater than the threshold signature.

16. The method of claim 8, wherein the reflective element is configured to focus the infrared radiation in the monitored area on the PIR sensor.

17. The method of claim 16, wherein the reflective element is a mirror.

* * * * *